United States Patent [19]

Strietzel

[11] 4,418,411
[45] Nov. 29, 1983

[54] METHOD AND APPARATUS FOR GENERATING AN EQUIPMENT REPLY SIGNAL FOR THE AUTOMATIC IDENTIFICATION OF OBJECTS AND/OR LIVING BEINGS

[75] Inventor: Rainer Strietzel, Heidelberg, Fed. Rep. of Germany

[73] Assignee: Brown, Boveri & Cif AG, Mannheim, Fed. Rep. of Germany

[21] Appl. No.: 242,177

[22] Filed: Mar. 10, 1981

[30] Foreign Application Priority Data

Mar. 11, 1980 [DE] Fed. Rep. of Germany ....... 3009179

[51] Int. Cl.³ ..................... G06F 11/00; G06K 7/01; H04Q 9/00
[52] U.S. Cl. ................................ 371/67; 340/870.16; 340/825.34
[58] Field of Search .................. 371/67; 340/146.3 K, 340/825.34

[56] References Cited

U.S. PATENT DOCUMENTS

| | | | |
|---|---|---|---|
| 3,679,828 | 7/1972 | Becky | 340/146.3 K |
| 3,813,658 | 5/1974 | Rich, Jr. | 340/146.3 K |
| 3,849,633 | 11/1974 | Reitboeck et al. | 340/146.3 K |
| 4,160,522 | 7/1979 | Dikinis | 340/146.3 K |
| 4,193,061 | 3/1980 | Zoltai | 371/67 |
| 4,242,663 | 12/1980 | Slobodin | 340/825.34 |
| 4,305,060 | 12/1981 | Apple et al. | 340/825.34 |

Primary Examiner—David H. Malzahn
Attorney, Agent, or Firm—Herbert L. Lerner; Laurence A. Greenberg

[57] ABSTRACT

Method and apparatus for generating an equipment reply signal for the automatic identification of objects and/or living beings, including a stationary interrogator having an energy transmitter, a receiver, an evaluator connected to the receiver, an opening code generator, and a first modulator connected to the energy transmitter, and a transponder fastened to the object or living being having a circuit unit with an energy receiver and converter, a code memory, a clock generator, a code transmitter, at least one antenna, an opening code receiver, an opening code memory, an opening code comparator connected to the opening code memory and the opening code receiver, a demodulator connected to the energy receiver and converter, and a second modulator connected to the demodulator, code transmitter, opening code transmitter and code memory, which includes radiating an opening code in the interrogator, storing the opening code in the transponder, radiating a code stored in the code memory by the code transmitter if the stored and radiated opening codes coincide, modulating a reply carrier signal on an energy wave with the first modulator, separating the reply carrier signal from the energy wave with the demodulator, modulating the reply signal carrier with the code with the second modulator, and radiating the modulated reply carrier signal as the reply signal with the code transmitter.

16 Claims, 2 Drawing Figures

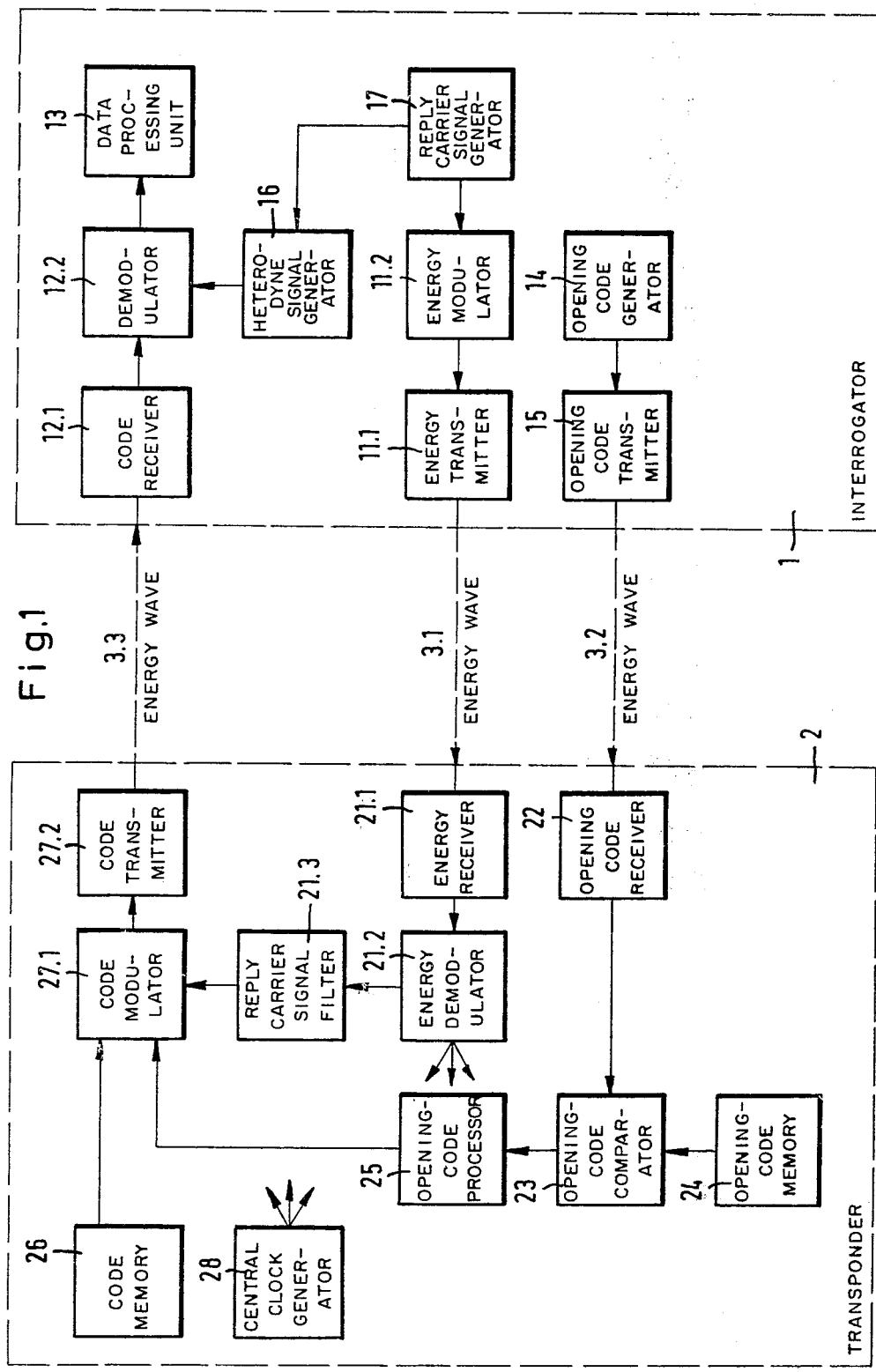

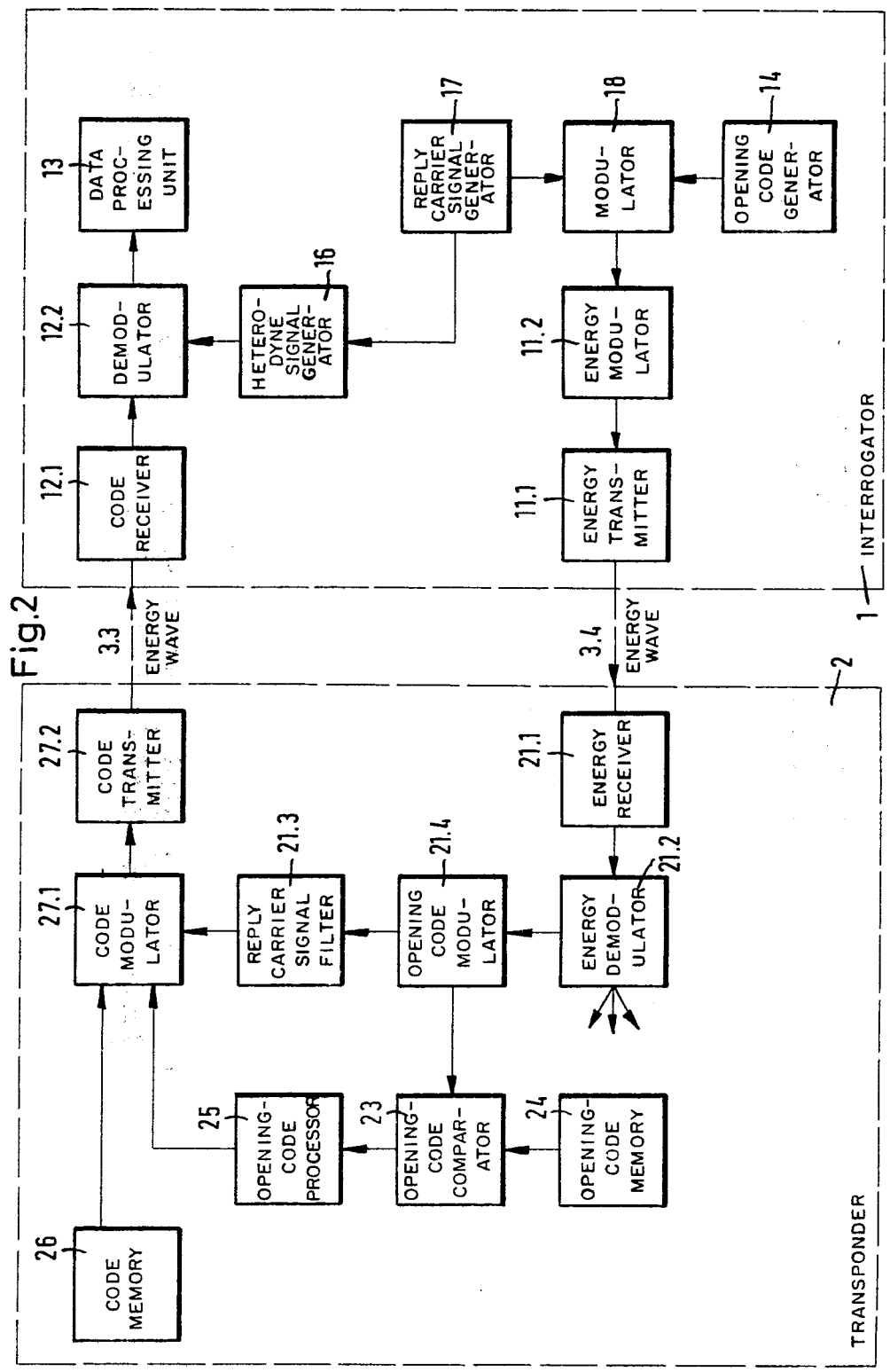

METHOD AND APPARATUS FOR GENERATING AN EQUIPMENT REPLY SIGNAL FOR THE AUTOMATIC IDENTIFICATION OF OBJECTS AND/OR LIVING BEINGS

The invention relates to a method for generating the reply signal of equipment for the automatic identification of objects and/or living beings, including a stationary interrogator and a transponder fastened to the object or the living being, where the interrogator has an energy transmitter, a receiver and an evaluator, and the transponder contains an energy receiver and converter, a code memory, a clock generator and a circuit unit containing a code transmitter, and at least one antenna, where the interrogator additionally, contains an opening code memory and an opening code transmitter, and the transponder additionally contains an opening code receiver, an opening code memory and an opening code comparator which are interconnected with the other modules of the transponder in such a manner that a code stored in the code memory is radiated by the code transmitter only if the opening code radiated by the transponder and stored by the inerrogator agree. The invention further relates to an apparatus for implementing this method.

Apparatus for automatic identification are known, for instance, from German Published, Non-Prosecuted Application DE-OS 25 08 201. The known apparatus radiates an energy beam from a stationary interrogator, for instance, toward the transponder which is fastened to the object to be identified. This energy is picked up by an energy-receiving device, such as an antenna or a solar generator and is converted into electric energy which serves for supplying the circuit unit in the transponder. As soon as the incident energy in the transponder is sufficient to make reliable operation of the transponder possible, the transponder radiates the information stored therein through a transmitter. For this purpose, a read-only memory is provided in the transponder or, if desired, an externally changeable supplementary memory. The fixed data of the object to be identified are contained in the read-only memory (ROM): Additional data such as place of destination, place of origin, etc. are stored, if required, in the variable memory.

The known devices make fastening to objects and/or living beings possible. They can be interrogated automatically, nondestructively and without contact at any time at arbitrarily selectable places. It is a disadvantage, however, that they are activated by any incident energy and then send out their stored data. Such a behavior is not always desirable, however.

The transponder, in which the process according to the invention takes place, is likewise intended for fastening to objects and/or living beings and is supplied with the required energy by an energy wave sent out by the interrogator. The transponders are constructed with integrated semiconductor thick or thin film technology.

The code transmitter contained in the transponder must radiate its reply signal with high frequency accuracy for receiver-construction and also regulatory reasons. Free-running oscillators such a R-C oscillators with simple circuits exhibit considerable temperature dependence; complicated circuits, in which the temperature dependence is compensated, cannot be used because of the small amount of supply energy available. The use of quartz oscillators is out of the question because of the space which the quartz crystal requires and because of the additional assembly costs.

It is accordingly an object of the invention to provide a method and apparatus for generating an equipment reply signal for the automatic identification of objects and/or living beings, which overcomes the hereinafore-mentioned disadvantages of the heretofore-known methods and devices of this general type, to be sent by the code generator of the transponder with high frequency stability and with a small amount of circuitry.

With the foregoing and other objects in view there is provided, in accordance with the invention, a method for generating an equipment reply signal for the automatic identification of objects and/or living beings, including a stationary interrogator having an energy transmitter, a receiver, an evaluator connected to the receiver, an opening code generator, and a first modulator connected to the energy transmitter, and optionally an opening code transmitter, and a transponder fastened to the object or living being having a circuit unit with an energy receiver and converter, a code memory, a clock generator, a code transmitter, at least one antenna, an opening code receiver, an opening code memory, an opening code comparator connected to the opening code memory and the opening code receiver, a demodulator connected to the energy receiver and converter, and a second modulator connected to the demodulator, code transmitter, opening code transmitter and code memory, which are interconnected with the other modules of the transponder, which comprises radiating an opening code in the interrogator, storing the opening code in the transponder, radiating a code stored in the code memory by the code transmitter if the stored and radiated opening codes coincide, modulating a reply carrier signal on an energy wave with the first modulator, separating the reply carrier signal from the energy wave with the demodulator, modulating the reply signal carrier with the code with the second modulator, and radiating the modulated reply carrier signal as the reply signal with the code transmitter.

Through the use of an opening code in addition to the radiation of energy, substantially higher security against unauthorized interrogation of the data stored in the transponder is obtained. On the other hand, authorized interrogation of the stored data is not made more difficult than with the method using the present apparatus. The entire electronic circuit unit of the transponder can be fabricated in miniaturized form, for instance as an integrated semiconductor circuit or as a thin-film circuit. It is also advantageous if subsequent unauthorized tinkering with the electronic circuit unit of the transponder leads to its destruction and thereby makes manipulation impossible.

Properties such as are generally known, for instance, from building security systems are given to the unit according to the invention; in these systems, some keys fit all locks, other keys fit only certain locks and, for instance, only a single key fits a particular lock. Applications which utilize these particular properties of the equipment according to the invention will be explained in detail further on.

The oscillator required for generating the reply carrier signal is disposed in the interrogator and can therefore generate the frequency with any desired accuracy. Since the energy wave radiated by the energy transmitter has relatively high intensity, the reply carrier signal can also be modulated-on with high intensity, so that the reply carrier signal, separated from the energy wave in the transponder, can be reradiated without further amplification.

In accordance with again another mode of the invention, there is provided a method which includes doubling the frequency of the reply carrier signal in the interrogator before it is radiated. Doubling the frequency of the reply carrier signal in the interrogator permits simple recovery of the original signal in the transponder.

In accordance with another mode of the invention, there is provided a method which includes amplitude modulating the energy wave with the reply carrier signal. Modulators and demodulators for amplitude modulation are particularly simple.

In accordance with a further mode of the invention, there is provided a method which includes frequency modulating the energy wave with the reply carrier signal.

In accordance with an added mode of the invention, there is provided a method which includes demodulating the reply carrier signal with a flank demodulator.

In accordance with an additional mode of the invention, there is provided a method which includes amplitude modulating the reply carrier signal with the code.

Preferably, the reply carrier signal, which separated from the energy wave in the transponder, is amplitude-modulated with the code stored in the code memory. This has the advantage that the modulator can be simultaneously used for inhibiting the code generator if there is no agreement with the opening code.

In accordance with again a further mode of the invention, there is provided a method which includes modulating the reply carrier with the opening code signal in the interrogator. This makes it possible to radiate all signal through a single antenna.

In accordance with again an added mode of the invention, there is provided a method which includes pulse width modulating the reply carrier signal. Pulse width modulation makes it possible to use demodulators with a digital technique which operate particularly interference-free.

In accordance with again an additional mode of the invention, there is provided a method which includes superimposing the reply signal in the inerrogator with a heterodyne signal derived from the reply carrier signal, and the signal is preferably used for the amplification and demodulation of the reply signal coming from the transponder. In this manner, not only the use of synchronous demodulators becomes possible; changes of the frequency of the reply carrier signal generator and the changes of the frequency of the code generator which is synchronous therewith rather have no influence on the reception and the processing of the reply signal, since the heterodyned signal derived from the reply carrier signal is also subjected to the same frequency changes. Highly stable oscillators are therefore not necessary; in addition, the demodulation of the reply signal can be performed by means of clock-controlled digital circuits, which are thus given considerable freedom from interference.

In accordance with the device of the invention, there is provided an apparatus for carrying out a method for generating an equipment reply signal for the automatic identification of objects and/or living beings, comprising a stationary interrogator for radiating an opening code, having an energy transmitter, a receiver, an evaluator connected to the receiver, an opening code generator, a reply carrier signal generator for the reply carrier signal, and an energy modulator connected between the signal generator and the energy transmitter for modulating an energy wave to be radiated by the energy transmitter with the reply carrier signal, and optionally an opening code transmitter, and a transponder for storing an opening code being fastened to the object or living being and having a circuit unit with an energy receiver and converter, a code memory, a clock generator, a code transmitter connected to the code memory, at least one antenna, an open code receiver, an opening code memory, an opening code comparator connected to the opening code memory, the opening code receiver and the code transmitter, a demodulator connected to the energy receiver and converter, and a reply carrier signal filter connected between the demodulator and code transmitter, which are interconnected with the other modules, the code transmitter being operable to radiate a code stored in the code memory if the opening code radiated by the interrogator and the opening code storing in the transponder coincide.

In accordance with another feature of the invention, there is provided a heterodyne or beat frequency signal generator connected to the reply carrier signal generator for generating a heterodyned signal from the reply carrier signal, and another demodulator connected to the code receiver and heterodyne signal generator for demodulating the reply signal with the heterodyne signal. This eliminates possible effects of frequency changes of the reply carrier signal generator.

In accordance with a further feature of the invention, there is provided a further modulator connected to the reply carrier signal generator and opening code generator for modulating an output signal of the opening code generator on the reply carrier signal before the reply carrier signal is modulated on the energy wave, and an opening code demodulator connected to the first-mentioned demodulator for separating the opening code from the reply carrier signal.

In accordance with an added feature of the invention, the further modulator is a pulse width modulator.

In accordance with an additional feature of the invention, there is provided another modulator connected to the code transmitter, the first-mentioned energy modulator and other modulator being amplitude modulators.

In accordance with yet an added feature of the invention, there is provided an opening code transmitter connected to the opening code generator.

In accordance with yet another feature of the invention, the opening code transmitter and energy transmitter are combined into a single unit in the interrogator.

In accordance with yet a further feature of the invention, the energy receiver and converter and the opening code receiver are combined into a single unit in the transponder.

In accordance with a concomitant feature of the invention, there is provided an opening code processor connected between the opening code comparator and the code transmitter.

A preferred application of the apparatus according to the invention is friend-or-foe identification in military equipment or long-distance detection and identification of military personnel. Since codes are already known today which are unbreakable, be it due to a mathematical encryption or coding or due to the extremely large number of possible combinations, reliable identification is assured. It is possible in this connection to open only the opening code memory with a simple code, so that the code memory gives only a code for friend-or-foe identification. A supplemental opening code memory can be activated by an additional opening code, whereby a supplemental code memory also sends out its supplemental codes. This makes it possible to interrogate additional data such as the military unit of the equipment or person, battle order, actual fighting strength or ammunition supply, for instance, and can be considered in a second data processor.

In an application to military personnel, in the "dog tag" for instance, personal data such as birth date, blood type, vaccinations, allergies, past illnesses, incompatibilities to medication, etc. can also be stored. To be able to interrogate this data, medics and doctors must be equipped with a portable interrogator. By appropriate coding it is possible to prevent the equipment given to a medic at the front from making the interrogation for purely military data possible, so that even if such equipment falls into the hands of the enemy, he cannot make use of it.

A further preferred field of application is the manufacture of fraud-proof license plates for motor vehicles which can also be used for long-distance detection. As soon as all motor vehicles are equipped with a device according to the invention, it is possible to carry out covert control at any location, for instance at freeway access lanes, bridges, crossings, traffic lights, patrol vehicles, such as during a gang search or even at border crossings. The interrogators radiate the energy field and the opening code, whereupon the transponders at the motor vehicle license plates are made to furnish its stored code. The codes received by the transponder are continuously passed on by radio to a central computer and are automatically compared with the search lists. As soon as a wanted motor vehicle is detected, this is reported back, whereupon the motor vehicle in question can be apprehended.

Since all data of a motor vehicle and not only the data of the license plate itself can be stored in the code memory and, if applicable, in the supplemental code memories, it is not possible to attach improper license plates to a motor vehicle. Furthermore attaching stolen motor vehicle plates to a so-called "double", i.e., a vehicle of the same series and the same exterior appearance, as is common among terrorists, is made impossible if motor vehicle plates are used which are equipped in accordance with the invention in a fraud-proof manner. Even the use of a forged motor vehicle plate without a built-in transponder leads to detection since such a plate does not produce a reply signal to an incident energy beam.

A motor vehicle "plate" is understood here to include not only the conventional number plate but also any other identification such as a window pane prepared in accordance with the invention, etc.

If an interrogator is installed in a monitored traffic light or at a radar speed trap station, addtional data is obtained regarding the motor vehicle which has committed the traffic infraction. Taking a photograph may possibly be dispensed with.

In this manner, traffic counts can also be carried out, with additional determination of individual data such as home location, age and type of vehicle, etc.

A further possibility is observation follow-up. There, the travel of a motor vehicle can be tracked fully automatically and centrally.

In addition, every motor vehicle itself can also be equipped with a transponder operating in accordance with the invention. Together with a motor vehicle license plate equipped in accordance with the invention, an unnoticed separation of plate and associated vehicle is no longer possible. Forged or stolen plates lead to different indications in the interrogator which are detected immediately by a simple code comparision, and are indicated.

In addition, even the motor vehicle papers can be equipped with a device according to the invention. This further increases the security against forgery and theft, where the important advantage exists over other already common or planned solutions of contactless, invisible remote interrogation and the possibility of fully automatically checking the interrogated data in a central computer.

A further large field of application is the preparation of forgery-proof personal papers which can be interrogated at any time, i.e., personal identifications, passports, checking cards, emergency identification cards, company identification cards, etc. If used in personal documents, it may then not be necessary to show the papers since the identifications can be interrogated automatically, even if they are optically invisible, and are contained in a suit pocket or a pocket book, for instance.

Automatic money dispensers which can be made to dispense cash upon insertion of a customer card and entering a personal code number on a keyboard are already in use today at several banking institutions. The customer card is a plastic card of the size of a Eurocheck or credit card which in addition carries the visually detectable data on the front, and magnetic-strip coding on the back which can be read automatically. On the magnetic strip are stored customer data, account number, withdrawal interval, limit of amount and the code number, which is known only to the customer. Especially due to storing the code number on the practically freely accessible magnetic strip, not much safety is provided against forgery, since the magnetization of the magnetic strip can be read out at any time. If a transponder according to the invention is used, however, the code number becomes accessible only if a secret opening code is emitted by the automatic money dispenser.

A further large area of applications of the device according to the invention is the securing of valuables and museum objects as well as goods in stores, against theft. For the purpose, the transponder is attached to the respective objects or goods.

In the case of security against theft only, the transponder at the object to be protected remains in the continuously radiating energy field of the interrogator. If the object is taken from the, optionally adjustable, area of the energy field, the connection to the code receiver is broken off immediately and an alarm is tripped. If in spite of this, the carrier succeeds in taking the object out of the building, the object can be pursued at any time with portable remote interrogators, can be localized and identified.

If the apparatus according to the invention is applied to safety against theft in warehouses, lending libraries, etc., the interrogator is located at the exit. As soon as an object gets into the energy field of the interrogator, from which the price label equipped with the transponder according to the invention or the correspondingly equipped library card has not been removed, the alarm is sounded.

The applications mentioned for theft protection serve only as examples. A similar application is possible with many other objects as well. Even animals and people, such as abduction victims, can be provided with transponders according to the invention, for instance, by swallowing the unit (the energy source is a battery in those cases), and can thereby also be tracked, localized and identified from a distance. It is of particular advantage here that the transponder emits a signal only if the correct opening code is radiated. Thereby localizing the equipment by unauthorized persons due to continuously emitted radiation, such as is the case with the conventional "minispies", is practically impossible.

A further field of application is the group of currency, i.e., coins, money bills, check blanks etc. Here, several safety ranges can be provided by means of the opening code memories and the supplemental opening code memories as well as the identification memories and the supplemental identification memories. With a simple code, determination of value and authenticity can be made electronically, for instance. By additional storage in the supplemental identification memory, stolen or blackmail money can be marked. This can be done for instance, where this marking can be recognized only by the police and banking institutions, since the opening code is known only to them. A third safety step can be addressed by a supplemental opening code which is known only to the banks or even only to the central bank.

From German Patent DE PS 16 96 245, a method for the manufacture of safety paper is already known, where ferromagnetic storage materials are embedded in the banknote paper. It is evident, however, that as above in the case of the customer card in automatic money dispensers, the coding in this so-called safety paper is accessible to anyone at any time, so that great safety actually does not exist. If, for instance, banknotes are equipped with the transponder according to the invention, automatic counting and sorting of the money can also be carried out in appropriate machines without the need for manually sorting and bundling the money first. To this end, only the value of the banknote must be stored along in the identification memory. If in addition, the serial number of the banknote is stored, the former can be compared continuously and fully automatically with the serial numbers of the banknotes which are in circulation and are stored in a central computer or are stored in a vault; if agreement is lacking, an alaram is released. However, even forged banknotes without transponders. according to the invention are detected since they emit no reply signal upon the incidence of an energy beam. Genuine banknotes, in which only the transponder is defective, can be sorted out fully automatically and destroyed.

Other features which are considered as characteristic for the invention are set forth in the appended claims.

Although the invention is illustrated and described herein as embodied in a method and apparatus for generating an equipment reply signal for the automatic identification of objects and/or beings, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a schematic block diagram of the construction of the interrogator and the transponder of the invention, used if the energy wave and the opening code are transmitted separately; and FIG. 2 is a view similar to FIG. 1 of an embodiment example with combined transmission of the energy wave and the opening code between the interrogator and the transponder.

Referring now to the figures of the drawing and first particularly to FIG. 1 thereof, there is seen as a block diagram an interrogator 1 which can be deployed in a stationary or in a mobil manner. The interrogator 1 substantially includes an energy transmitter 11.1 which emits an energy wave 3.1. The interrogator 1 further contains an opening code generator 14. The opening code is transmitted by the opening code transmitter 15 on an energy wave 3.2. The interrogator 1 also contains a code receiver 12.1, when receives data from a transponder over an energy wave 3.3. The data received by the code receiver 12.1 is evaluated in a data processing unit 13 and, if desired, indicated.

The interrogator 1 further contains a reply carrier signal generator 17, which generates a reply carrier signal that modulates the energy wave 3.1 of the energy transmitter 11.1 through an energy modulator 11.2. The modulator 11.2 is an amplitude modulator.

The interrogator 1 further contains a heterodyne signal generator 16 which forms a heterodyned signal from the reply carrier signal, by means of which the reply signal which is received by the code receiver 12.1 and which comes from the transponder 2, is demodulated in a demodulator 12.2, before it is fed to the data processing unit 13.

The transponder 2 contains an energy receiver 21.1 which receives the energy radiated by the energy transmitter 11.1. In an energy demodulator 21.2 following the energy receiver 21.1., the reply carrier signal is separated from the energy signal. The energy signal is converted into a supply voltage for the other modules of the transponder 2. The reply carrier signal is fed to a reply carrier signal filter 21.3. This filter 21.3 may be constructed as a lowpass filter or as a bandpass filter in analog technology. A particularly simple and space-saving embodiment is obtained if the filter 21.3 is constructed digitally.

In a code modulator 27.1, the reply carrier signal coming from the reply carrier signal filter 21.3 is modulated with the code readout from a code memory 26 and radiated by a code transmitter 27.2 as the reply signal. If the reply carrier signal transmitted on the energy wave has enough power, it is not necessary to provide an amplifier stage for the reply signal in the code transmitter 27.2, so that the energy supply requirement of the transponder 2 becomes very small.

The opening code radiated by the opening code transmitter 15 of the interrogator 1 is received by an opening code receiver 22 of the transponder 2, is demodulated and passed on to the opening-code comparator 23. The comparator 23 compares the received opening code with the code stored in an opening-code memory 24. If the two codes coincide, a signal is give to the code modulator 27.1 through an opening-code processor 25, which may optionally be combined with the opening-code comparator 23, whereupon the modulation of the reply carrier signal coming from the filter 21.3 with the code coming from the code memory 26 is released.

A central clock generator 28, which controls and coordinates the logic cycle of the data processing in the individual modules may also be disposed in the transponder 2. However, it is also possible to transmit the clock signal, like the reply carrier signal, from the interrogator 1.

For transmitting the energy wave of the reply carrier signal and the data from the interrogator 1 to the transponder 2 and back, the entire spectrum of the electromagnetic waves can in principle be used. It should be taken into consideration, however, that a high transmission speed must be achieved and that as far as possible, the energy radiated by the energy transmitter 11.1 should be focused on the receiving antenna of the transponder, since the antenna must naturally be made extremely small in many applications and should nevertheless receive a high energy density. Since penetration of different articles such as clothing, insulating material etc. is desired simultaneously, the microwave portion of the electromagnetic spectrum will generally be used for the energy wave.

For the same reasons, the frequency of the reply carrier signal should be as high as possible. However, to allow processing with digital building blocks or components which require little energy and only a low supply voltage, this frequency should be as low as possible. With the present state of the art in semiconductor technology, the frequency of the reply carrier signal will therefore be about 150 megahertz.

FIG. 2 shows an embodiment example, in which an energy wave 3.4 is modulated not only with the reply carrier signal but also with the opening code signal. For this purpose, the reply carrier signal coming from the reply carrier signal generator 17, with the opening code coming from the opening code memory 14 is modulated in a further modulator 18 and is then modulated in turn on the energy wave of the energy transmitter 11.1 by means of the energy modulator 11.2.

The modulator 18 is constructed as a pulse width modulator. Pulse width modulation has the advantage that the starting flanks of the pulses are equidistant; only the falling flanks are modulated. Due to this fact, the reply carrier signal can easily be recovered on the receiving side by triggering at the starting flank.

This takes place in the transponder by means of the opening code modulator 21.4 which separates the opening code from the reply carrier signal and passes on the code to the opening-code comparator 23, and the reply carrier signal to the reply carrier signal filter 21.3. If a flipflop is used at this point, a frequency doubling which was performed before in the interrogator 1, is reversed.

The other modules operate as described herein in connection with FIG. 1. The substantial improvement over known apparatus is that no oscillator in the transponder is required for the reply carrier signal, since the reply carrier signal is transmitted from the interrogator 1 and is only reradiated by the transponder 2. This makes a simplification of the circuit possible, as well as a reduction of the energy required and of the volume of the transponders.

There is claimed:

1. Method for generating an equipment reply signal for the automatic identification of objects and/or living beings, including a stationary interrogator having an energy transmitter, a receiver, an evaluator connected to the receiver, an opening code generator, and a first modulator connected to the energy transmitter, and a transponder fastened to the object or living being having a circuit unit with an energy receiver and converter, a code memory, a clock generator, a code transmitter, at least one antenna, an opening code receiver, an opening code memory, an opening code comparator connected to the opening code memory and the opening code receiver, a demodulator connected to the energy receiver and converter, and a second modulator connected to the demodulator, code transmitter, opening code comparator and code memory, which comprises radiating opening codes in the interrogator, transmitting the radiated opening codes from the interrogator to the transponder, radiating a code stored in the code memory by the code transmitter if the opening code stored in the opening code memory of the transponder and the radiated opening codes transmitted from the interrogator to the transponder coincide, modulating a reply carrier signal on an energy wave with the first modulator of the interrogator, transmitting the modulated energy wave with the energy transmitter of the interrogator to the energy receiver and converter of the transponder, separating the reply carrier signal from the energy wave with the demodulator of the transponder, modulating the reply carrier signal with the code with the second modulator in the transponder, and transmitting the modulated reply carrier signal as a reply signal with the code transmitter.

2. Method according to claim 1, wherein the step of modulating the energy wave with the reply carrier signal is carried out by amplitude modulating.

3. Method according to claim 1, wherein the step of modulating the energy wave with the reply carrier signal is carried out by frequency modulating.

4. Method according to claim 3, wherein the demodulator is a flank demodulator.

5. Method according to claim 1, which includes doubling the frequency of the reply carrier signal in the interrogator before the reply carrier signal is transmitted to the transponder by the energy transmitter 6. Method according to claim 1, which includes amplitude modulating the reply carrier signal with the code stored in the code memory with the second modulator of the transponder connected to the code memory and the code transmitter of the transponder.

7. Method according to claim 1, which includes modulating the reply carrier signal with the opening code signal in the interrogator.

8. Method according to claim 7, which includes pulse width modulating the reply carrier signal.

9. Method according to claim 1, wherein the interrogator includes a reply carrier signal generator connected to the first modulator, a heterodyne signal generator connected to the reply carrier signal generator, and a demodulator connected betweeen the heterodyne signal generator and the receiver, which includes forming a heterodyned signal with the heterodyne signal generator of the interrogator from a reply carrier signal generated by the reply carrier signal generator of the interrogator, and demodulating the reply signal received by the receiver from the code transmitter of the transponder in the demodulator of the interrogator with the heterodyned signal, before feeding the reply signal to the evaluator of the interrogator.

10. Apparatus for generating an equipment reply signal for the automatic identification of objects and/or living beings, comprising a stationary interrogator having an energy transmitter, a code receiver, an evaluator connected to said code receiver, an opening code generator, an opening code transmitter connected to said opening code generator, a reply carrier signal generator for generating a reply carrier signal, and an energy modulator connected between said reply carrier signal generator and said energy transmitter for modulating an energy wave to be radiated by said energy transmitter with the reply carrier signal, and a transponder being fastened to the object or living being and having a circuit unit with an energy receiver and converter, a code memory, a clock generator, a code transmitter connected to said code memory, at least one antenna connected to said energy receiver and converter, an opening code receiver, an opening code memory, an opening code comparator connected to said opening code memory and to said opening code receive, an opening code processor connected in series with said opening code comparator, a code modulator being connected to said code memory and being connected between said code transmitter and said opening code processor, a demodulator connected to said energy receiver and converter, and a reply carrier signal filter connected in series with said code modulator and being connected between said demodulator and code transmitter, said code transmitter being operable to radiate a code stored in said code memory if the opening code radiated by said interrogator and the opening code stored in said transponder coincide.

11. Apparatus according to claim 10, including a heterodyne signal generator in said interrogator connected to said reply carrier signal generator in the interrogator for generating a heterodyned signal from the reply carrier signal, and a demodulator in the interrogator connected to said code receiver and heterodyne signal generator for demodulating the reply signal with the heterodyne signal.

12. Apparatus according to claim 10 or 11, including a further modulator connected to said reply carrier signal generator and opening code generator in said interrogator for modulating an output signal of said opening code generator on the reply carrier signal before the reply carrier signal is modulated on the energy wave, and an opening code demodulator in the transponder connected to said first-mentioned demodulator and to said reply carrier filter in the transponder for separating the opening code from the reply carrier signal.

13. Apparatus according to claim 12, wherein said further modulator is a pulse width modulator.

14. Apparatus according to claim 10, wherein said first-mentioned energy modulator and code modulator are amplitude modulators.

15. Apparatus according to claim 10, wherein said opening code transmitter and energy transmitter are combined into a single unit in said interrogator.

16. Apparatus according to claim 10, wherein said energy receiver and converter and said opening code receiver are combined into a single unit in said transponder.

* * * * *